United States Patent
Tachibana et al.

(10) Patent No.: US 7,482,388 B2
(45) Date of Patent: Jan. 27, 2009

(54) POLYMER ELECTROLYTE MEMBRANE HAVING EXCELLENT DURABILITY

(75) Inventors: Toshimitsu Tachibana, Ibaraki (JP); Soji Nishiyama, Ibaraki (JP); Yozo Nagai, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/218,486

(22) Filed: Sep. 6, 2005

(65) Prior Publication Data

US 2006/0051647 A1 Mar. 9, 2006

(30) Foreign Application Priority Data

Sep. 8, 2004 (JP) .................. P. 2004-260905

(51) Int. Cl.
*C08J 5/22* (2006.01)
*H01M 8/10* (2006.01)

(52) U.S. Cl. .............. 521/27; 429/33; 429/30; 429/309; 429/314

(58) Field of Classification Search ............ 521/27; 429/30, 33, 309, 314
See application file for complete search history.

(56) References Cited

U.S. PATENT DOCUMENTS

| | | | | |
|---|---|---|---|---|
| 5,399,184 | A * | 3/1995 | Harada | 29/623.4 |
| 5,672,438 | A * | 9/1997 | Banerjee et al. | 429/33 |
| 5,981,097 | A * | 11/1999 | Rajendran | 429/33 |
| 7,094,469 | B2 * | 8/2006 | Moya | 428/421 |
| 2003/0059683 | A1 * | 3/2003 | Blau et al. | 429/314 |
| 2003/0087972 | A1 * | 5/2003 | Taniguchi et al. | 521/27 |
| 2004/0024123 | A1 * | 2/2004 | Moya | 525/72 |

FOREIGN PATENT DOCUMENTS

| | | |
|---|---|---|
| WO | WO 96/29752 A1 | 9/1996 |
| WO | WO 9629752 A1 * | 9/1996 |
| WO | WO 03/033576 A1 | 4/2003 |
| WO | WO 2005/001979 A2 | 1/2005 |

OTHER PUBLICATIONS

European Search Report dated Feb. 9, 2006.

* cited by examiner

*Primary Examiner*—Randy Gulakowski
*Assistant Examiner*—Michael M Bernshteyn
(74) *Attorney, Agent, or Firm*—Sughrue Mion, PLLC

(57) ABSTRACT

A polymer electrolyte membrane for a polymer electrolyte fuel cell, that overcomes disadvantages of the conventional polymer ion-exchange membranes including fluorine-based polymer electrolyte membranes and can maintain cell characteristics even in use over a long period of time (e.g., several thousand hours). The polymer electrolyte membrane comprises a fluorine polymer substrate having grafted thereon monomers having sulfone groups as a cation-exchange group, wherein a main chain of the graft chain comprises a hydrocarbon or a partially fluorinated hydrocarbon, and sulfone groups or substituents having sulfone groups are bonded as a side chain, and wherein in element compositional ratio by ESCA, at least one surface of the polymer electrolyte membrane has O/S value of 5.0 or higher, and a surface element proportion of S is 0.4-5.0%.

2 Claims, No Drawings

POLYMER ELECTROLYTE MEMBRANE HAVING EXCELLENT DURABILITY

FIELD OF THE INVENTION

The present invention relates to a polymer electrolyte membrane showing stable properties even in a long-term use in a solid polymer electrolyte fuel cell (hereinafter referred to as "PEFC" for brevity).

BACKGROUND ART

Due to that PEFC has high energy density, PEFC is expected to use in wide fields of, for example, domestic co-generation power source, power source for mobile instruments, power source for automobiles, and a portable auxiliary power source.

In PEFC, a polymer electrolyte membrane functions as an electrolyte for conducting protons, and simultaneously plays a role of a diaphragm for preventing hydrogen or methanol, which is a fuel, and oxygen from being directly mixed. Such a polymer electrolyte membrane requires to, for example, have high ion-exchange capacity as an electrolyte, be electrochemically stable and have low electric resistance because of passing electric current over a long period of time, have high mechanical strength as a membrane, and have low gas permeability to hydrogen or methanol, which is a fuel, and oxygen.

A perfluorosulfonic acid membrane (NAFION, a registered trade mark, a product of du Pont) is generally used as such a polymer electrolyte membrane. However, conventional fluorine-based polymer ion-exchange membranes including NAFION had the problems that although chemical stability is excellent, ion-exchange capacity is low, and further because of insufficient water retention property, drying of the ion-exchange membrane proceeds, resulting in deterioration of proton conductivity. If many sulfonic acid groups are introduced into the membrane as a countermeasure of the problems, membrane strength remarkably decreases due to water retention, and the membrane easily breaks. Thus, it has been a difficult problem to achieve good balance between proton conductivity and membrane strength. Further, a fluorine-based polymer electrolyte membrane such as NAFION is very expensive because synthesis of a fluorine monomer which is a raw material is complicated, and this is a great hindrance in putting PEFC into practical use.

In view of the above, development of high performance polymer electrolyte membrane with low cost is proceeded as a substitute for the fluorine-based polymer electrolyte membrane including NAFION. As one example, JP-A-9-102322 proposes a polymer electrolyte membrane synthesized by introducing styrene monomers into an ethylene tetrafluoroethylene copolymer (ETFE) by radiation grafting reaction, followed by sulfonation.

However, the conventional polymer electrolyte membranes including the above membrane had the problem that output is greatly decreased in a long-term use. The reason for this is that adhesion between an electrode and a polymer electrolyte membrane decreases by a long-term use. In other words, a space generates between the electrode and the polymer electrolyte membrane, and proton conductivity is disturbed at that portion.

As a technique to improve adhesion between a polymer electrolyte membrane and an electrode, JP-A-4-220957 discloses a method of forming unevenness having a size of about 1-5 μm on a surface of a polymer electrolyte membrane by plasma etching treatment, thereby increasing a contact area.

However, this method involved the following problems. Although it is possible to increase a contact area to an electrode by forming unevenness on the surface of a polymer electrolyte membrane, when considering a long-term use, stress such as expansion or shrinkage of a membrane is continuously applied to a polymer electrolyte membrane due to change of liquid retention amount and temperature of the membrane. As a result, where the size of unevenness is too large, the membrane breaks starting from particularly depression. Further, in the case of a long-term use, the effect is not sufficient in the point of durability.

SUMMARY OF THE INVENTION

The present invention has been made in view of the above conventional problems.

Accordingly, an object of the present invention is to provide a polymer electrolyte membrane for a polymer electrolyte fuel cell, that overcomes disadvantages of the conventional polymer ion-exchange membranes including fluorine-based polymer electrolyte membranes and can maintain cell characteristics even in use over a long period of time (e.g., several thousand hours).

The present inventors have found that deterioration of cell characteristics (output, durability and the like) in a long-term use is due to insufficient adhesion of a polymer electrolyte membrane to an electrode material and dimensional change of a polymer electrolyte membrane.

Specifically, the present inventors have found the following facts. A polymer electrolyte membrane is in a state of retaining a liquid such as water or methanol used as a fuel in a direct methanol fuel cell, in the cell inside. Dimensional change (swelling and shrinkage) of the polymer electrolyte membrane generates by changing the liquid retention amount depending on operation conditions of the cell. Such a phenomenon repeatedly occurs in a long-term use. Even though the electrode and the polymer electrolyte membrane are in an adhered state at the initial stage, peeling gradually generates at the interface, and cell characteristics deteriorate due to the peeling.

Therefore, the present invention provides a polymer electrolyte membrane that can maintain adhesion to an electrode material despite of change in use state or environment, particularly in use in a fuel cell.

The polymer electrolyte membrane for a polymer electrolyte fuel cell according to the present invention comprises a fluorine polymer substrate having grafted thereon monomers having sulfone groups as a cation-exchange group, wherein a main chain of the graft chain comprises a hydrocarbon or a partially fluorinated hydrocarbon, and sulfone groups or substituents having sulfone groups are bonded as a side chain, and wherein in element compositional ratio by X-ray photoelectron spectroscopy (ESCA), at least one surface of the polymer electrolyte membrane has O/S value of 5.0 or higher, and a surface element proportion of S is 0.4-5.0%.

In a preferred embodiment, the polymer electrolyte membrane has a rate of area change after dipping in a 40 wt % methanol aqueous solution at a liquid temperature of 25±2° C. for 24 hours of 40% or lower.

The polymer electrolyte membrane of the present invention is that materials of the substrate and graft chain are limited, and surface treatment is conducted after imparting ion conductivity to the membrane. Use of such a membrane as a polymer electrolyte membrane for PEFC makes it possible to improve adhesion to an electrode and exhibit stable properties in a long-term use as a fuel cell.

DETAILED DESCRIPTION OF THE INVENTION

The present invention is described in detail below.

The polymer electrolyte membrane of the present invention can be produced by using a fluorine-based polymer membrane having imparted thereto a crosslinking structure by, for example, radiation reaction as a substrate, introducing monomers having proton-exchange groups into the substrate by graft reaction, and modifying at least one surface of the membrane by discharge treatment. This can provide a polymer electrolyte membrane that can maintain the required properties even in a long-term use (for example, several thousand hours) as a fuel cell.

The substrate that can be used is preferably a fluorine-based polymer having high durability against electrochemical reaction and the like in a cell. Examples of the fluorine-based polymer include polytetrafluoroethylene (hereinafter referred to as "PTFE" for simplicity), tetrafluoroethylene-hexafluoropropylene copolymer (hereinafter referred to as "FEP" for simplicity), tetrafluoroethylene-perfluoroalkylvinyl ether copolymer (hereinafter referred to as "PFA" for simplicity), polyvinylidene fluoride (hereinafter referred to as "PVDF" for simplicity), ethylene-tetrafluoroethylene copolymer (hereinafter referred to as "ETFE" for simplicity) and ethylene-chlorotrifluoroethylene copolymer (hereinafter referred to as "ECTFE"). When those substrates are previously crosslinked, a rate of area change due to liquid retention can be minimized. The substrate can be crosslinked by the conventional methods. For example, JP-A-6-116423 discloses a method of crosslinking PTFE, and JP-A-2001-348439 discloses a method of crosslinking FEP or PFA. The polymer substrate is in a form of a membrane (film) from the demand for utilization as a polymer electrolyte membrane for PEFC. Size and thickness of the membrane can appropriately be determined.

Graft chain in the present invention can be obtained by grafting monomers onto the substrate using, for example, radiation. Examples of the monomer that can be used in the present invention include monomers having vinyl groups, and monomers having vinyl groups in which part of hydrogens bonded to the vinyl group is substituted with other atom or functional group (those monomers are hereinafter referred to as "vinyl monomers"). The monomers can be used in one kind, or mixtures of several kinds of monomers. When a monomer forming the graft chain is represented by the formula $H_2C=CXR$, $H_2C=CX-$ moiety corresponds to a main chain, wherein X represents H, hydrocarbon or F. R— moiety corresponds to a side chain, and is sulfonated by sulfonation described hereinafter. The monomer represented by the following formula (1) is preferably used.

$$H_2C=CXR_1 \quad (1)$$

wherein when X is H, $R_1$ represents $-O-C_nH_{2n+1}$, $-C(=O)-C_nH_{2n+1}$, $-C(=O)-O-C_nH_{2n+1}$,

wherein $R_2$ represents $-H$, $-CH_3$, $-CH_2Cl$, $-CH_2OH$, $-C(CH_3)_3$, $-CH_2SO_3Na$, $-Cl$, $-Br$ or $-F$;

when X is $CH_3$, $R_1$ represents $-C_6H_5$ or $-C(=O)-OH$; and when X is F, $R_1$ represents $-C(=O)-OH$ or $-C(=O)-C_nH_{2n+1}$ wherein n is 1-10.

Of the monomers represented by the formula (1) above, aromatic monomers containing benzene ring in $R_1$ are preferably used from the standpoint that the sulfonation treatment described hereinafter is easily conducted.

A crosslinking agent having a plurality of unsaturated bonds having graft reactivity in the molecule can also be used as the vinyl monomer. The vinyl monomer is not limited to the above monomers, and examples of the vinyl monomer include 1,2-bis(p-vinylphenyl), divinylsulfone, ethylene glycol divinyl ether, diethylene glycol divinyl ether, triethylene glycol divinyl ether, divinylbenzene, cyclohexane dimethanol divinyl ether, phenylacetylene, diphenylacetylene, 1,4-diphenyl-1,3-butadiene, diallyl ether, 2,4,6-triallyloxy-1,3,5-triazine, triallyl-1,2,4-benzenetricarboxylate, triallyl-1,3,5-triazine-2,4,6-trione, butadiene, and isobutene. Use of such a crosslinking agent can crosslink the graft chain. Formation of a crosslinked structure in the graft chain can suppress swelling of the membrane.

Graft polymerization of the monomer onto a polymer substrate can be conducted by either of a pre-irradiation method of irradiating the substrate with radiation and then reacting with the monomer, or a simultaneous irradiation method of simultaneously irradiating the substrate and the monomer with radiation to polymerize the monomer. The pre-irradiation method is preferably used in that formation amount of a homopolymer which is not grafted onto the substrate is small. The pre-irradiation method includes the following two methods. One is a polymer radical method that irradiates a polymer substrate with radiation in an inert gas, and other is a peroxide method that irradiates the substrate with radiation under oxygen-present atmosphere. Either method can be used in the present invention.

One example of the pre-irradiation method is described. A polymer substrate is placed in a glass vessel. The inside of the vessel is vacuum deaerated and then replaced with an inert gas atmosphere. The vessel containing the substrate is irradiated with electron beams or γ-rays at −10 to 80° C., preferably in the vicinity of room temperature, at a dose of 1-500 kGy. The vessel is filled with monomers to conduct graft reaction. Oxygen gas contained in the monomers is previously removed by, for example, bubbling with an inert gas not containing oxygen, or freeze deaeration. The monomers may be a single kind or a mixture of two or more kinds, or may be dissolved in or diluted with a suitable solvent. Where a previously crosslinked polymer substrate is used, graft reaction is conducted at generally 30-150° C., preferably 40-80° C.

The polymer thus obtained has a degree of grafting (weight percent of graft chain to polymer substrate before polymerization) of 8-70% by weight, preferably 10-50% by weight. The degree of grafting can appropriately be changed depending on irradiation dose, polymerization temperature, polymerization time or the like.

In the subsequent step, cation-exchange groups such as sulfone group are introduced into the polymer substrate having the graft chain introduced therein. Introduction of the cation-exchange group into the graft chain can be conducted by the conventional method. For example, JP-A-2001-348439 discloses conditions of sulfone group introduction. Specifically, a graft-treated film is dipped in a chlorosulfonic acid solution having a concentration of 0.2-0.5 mol/liter using 1,2-dichloromethane as a solvent, and reaction is conducted at 10-80° C. for 1-48 hours. After completion of the reaction, the film is sufficiently washed with water. Concentrated sulfuric acid, fuming sulfuric acid, sulfur trioxide, sodium thiosulfate or the like can be used as a sulfonating agent necessary for sulfonation reaction. Any kind of sulfonating agent can be used so long as it can introduce sulfone group.

The cation-exchange group introduced is preferably sulfone group that is a strong acid group from the point that proton conductivity is improved, but is not limited thereto. The cation-exchange group introduced may be a single kind or a mixture of two or more kinds. Where plural kinds are introduced, sulfone group and other cation-exchange group are preferably introduced. Examples of the other cation-exchange group include carboxyl group and phosphone group.

The polymer electrolyte membrane of the present invention has an elemental composition that at least one surface of the polymer electrolyte membrane has O/S value of 5.0 or higher, preferably 7.0 or higher, and a surface element proportion of S is 0.4-5.0%, preferably 0.5-3.0. It is preferable that both surfaces of the membrane are satisfied with those properties. In the polymer electrolyte membrane having sulfone groups, or sulfone groups and other ion-exchange groups, on the graft chain, it is possible to increase the amount of the cation-exchange groups introduced, that is, O/S value, by increasing the degree of grafting. The amount of the hydrophilic groups introduced increases with increasing the amount of the cation-exchange groups introduced, and this advantageously affects adhesion. On the other hand, however, the rate of area change when absorbing water or the like and swelling increases proportionally, resulting in increasing stress acting to the interface between the electrode and the polymer electrolyte membrane in an adhered state. For this reason, it is important to introduce cation-exchange groups in an amount necessary to satisfy the properties such as proton conductivity necessary as the polymer electrolyte membrane, and to increase the amount of hydrophilic groups introduced at only the polymer electrolyte membrane surface contributing to adhesion to the electrode. In other words, it is very important to restrict element proportion of S originated from sulfone group and also increase O/S value in order to achieve both proton conductivity and adhesion to electrode.

The method of increasing O/S value while restricting element proportion of S includes a method of using an oxygen-containing vinyl monomer as a monomer to be grafted, and a method of discharge treating at least one surface of the polymer electrolyte membrane. The term "oxygen-containing vinyl monomer" used herein means a vinyl monomer in which a substituent bonded to a vinyl group contains oxygen. Examples of such a monomer include monomers represented by the above-described formula (1) in which $R_1$ contains oxygen. Where the oxygen-containing vinyl monomers are grafted onto a bulk of the polymer electrolyte membrane, the membrane is easily hydrophilicized by the influence of the oxygen-containing functional group in the monomer, and as a result, swelling property of the membrane is liable to increase. Therefore, considering that the purpose of increasing O/S value is to improve adhesion of a polymer electrolyte membrane to an electrode material, it is preferable to conduct modification on only the surface of the polymer electrolyte membrane. When discharge treatment is conducted to introduce a hydrophilic functional group such as hydroxyl group, carbonyl group or carboxyl group to the surface of membrane, chemical bonding force to components contained in the electrode can be increased, making it possible to maintain adhesion over a long period of time.

The discharge treatment can be conducted by plasma treatment with glow discharge, sputter etching treatment, atmospheric pressure plasma treatment, corona treatment or the like. Of those, plasma treatment with glow discharge and sputter etching treatment are preferably used from the points that the treatment can be conducted in a specific gas atmosphere under reduced pressure, and stable and effective treatment can be conducted by selecting gas species. The gas species is preferably a material containing oxygen atom, such as oxygen, water or carbon dioxide, or a mixed gas containing those in the plasma treatment; and argon, nitrogen or the like in addition to the above materials, in the sputter etching treatment. In the sputter etching treatment, charged frequency used is 13.56 MHz that is an industrially assigned frequency, and discharge energy calculated from a product of treatment time and discharge power is preferably 1-1,000 J/cm$^2$, more preferably 5-200 J/cm$^2$. Atmosphere pressure in treatment is preferably 0.05-200 Pa, more preferably 1-100 Pa.

When the polymer electrolyte membrane is prepared in this procedure, both the substrate and the graft chain are treated with the discharge treatment. In particular, modification effect of the graft chain comprising a hydrocarbon or a partially fluorinated hydrocarbon is increased, and as a result, far high treatment effect is obtained by modification of the graft chain, rather than modification effect of a fluorine substrate itself. This is further remarkable in the case of a perfluoro subsrate such as PTFE, PFA or FEP, and further high adhesion can be achieved as compared with the case of modifying a perfluoro polymer electrolyte membrane including Nafion. In the present invention, due to that the polymer electrolyte membrane has a graft chain comprising a hydrocarbon or a partially fluorinated hydrocarbon, modification effect at this portion can further effectively be obtained.

Regarding the surface form, effect is obtained by treating at least one surface of the polymer electrolyte membrane. However, where both surfaces are treated, the effect is increased. As a result, it is preferable to treat both surfaces of the polymer electrolyte membrane.

The polymer electrolyte membrane according to the present invention is required that a rate of area change after dipping the membrane in a 40 wt % methanol aqueous solution at a liquid temperature of 25±2° C. for 24 hours is 40% or lower. The term "rate of area change" used herein means a rate of change in area of a membrane when liquid retention reaches a saturated state, compared with the area before liquid retention. Where the rate of area change exceeds 40%, there is the case that it is difficult to maintain adhesion to an electrode obtained by specifying elemental ratio on the surface of a polymer electrolyte membrane. This property can be controlled by a degree of grafting of a polymer electrolyte membrane, an amount of ion-exchange group introduced such as sulfone group, a degree of crosslinking (crosslinking of a substrate, amount of crosslinking agent added, etc.) or the like.

The rate of area change of 40% or lower provides the advantages that swelling can be suppressed, and in the case of a direct methanol fuel cell, the effect of suppressing cross-leakage of methanol as a fuel is obtained, in addition to that adhesion to an electrode can be maintained.

The polymer electrolyte membrane of the present invention has electroconductivity of preferably 0.03 $\Omega^{-1}$ cm$^{-1}$ or higher, more preferably 0.1 $\Omega^{-1}$ cm$^{-1}$ or higher. Where the electroconductivity is lower than 0.03 $\Omega^{-1}$ cm$^{-1}$, membrane resistance is large, making it difficult to obtain sufficient output.

Thickness of a polymer electrolyte membrane is mentioned as the property relating to membrane resistance. It is preferable to increase thickness of a membrane in order to decrease membrane resistance. However, too small thickness of the membrane gives rise to the problems that membrane strength decreases, resulting in that the membrane is liable to break, and defect of a membrane, such as pinhole, is liable to generate. In view of this, the thickness is preferably 5-300 µm, more preferably 20-150 µm.

JP-A-4-220957 and JP-A-2001-229936 propose positively forming unevenness on a surface of a polymer electrolyte membrane for the purpose of improving adhesion. However, as described before, this leads the polymer electrolyte membrane to breakage in a long-term use, and also leads membrane thickness to local scattering. Therefore, too large unevenness is not preferable. The unevenness is generally 1 µm or lower, preferably 0.5 µm or lower, in terms of Ra (arithmetic mean roughness; according to JIS B 0601).

The present invention is described in more detail by reference to the following examples, but it should be understood that the invention is not construed as being limited thereto.

EXAMPLE 1

PTFE film (a product of Nitto Denko Corporation; Part No. 900; thickness 50 µm) was cut into 10 cm square, and placed in SUS-made autoclave irradiation vessel equipped with heater (inner diameter: 4 cm; height: 30 cm). The vessel was deaerated to $1 \times 10^{-2}$ Torr (1.3 Pa), and then filled with argon gas such that inner pressure is 1 atm. Electricity was passed through the vessel heater to heat the inside of the vessel to 340° C. The vessel was irradiated with $^{60}$Co-γ ray in a dose rate of 3 kGy/hr at a dose of 120 kGy. After irradiation, the vessel was cooled, and the film was taken out of the vessel to obtain a crosslinked PTFE.

This crosslinked PTFE film was placed in a glass-made separable vessel with a cock (inner diameter: 3 cm; height: 20 cm), deaerated and filled with argon gas of 1 atm. Under this state, the vessel was again irradiated with $^{60}$Co-γ ray in a dose rate of 10 kGy/hr at a dose of 60 kGy. About 100 g of a styrene/toluene mixed solution (a mixed solution of 50 vol % styrene and 50 vol % toluene) previously deaerated was introduced into the vessel under argon atmosphere. The film was under the state of completely dipping in the mixed solution. After introduction of the mixed solution, the vessel was heated at 60° C. for 15 hours to conduct graft reaction. After completion of the reaction, the film was sufficiently washed with toluene, and dried to obtain a graft film.

This graft-polymerized, crosslinked PTFE film was dipped in 0.3M chlorosulfonic acid diluted with 1,2-dichloroethane, heated at 60° C. for 24 hours under a sealed state, washed with water and dried to obtain a sulfonated graft film, i.e., a polymer electrolyte membrane.

This polymer electrolyte membrane was placed on a surface of an electrode of a sputter treatment device having parallel flat-plate electrodes. Under this state, pressure was reduced, and $H_2O$ gas was introduced into the system to adjust to 13 Pa. Under this atmosphere, sputtering treatment was conducted under conditions of frequency of 13.56 MHz and treatment energy of 20 J/cm². The inside of the treatment tank was once returned to atmospheric pressure, the film was turned over and then fixed, and the same operation was repeated. Thus, sputtering treatment of both sides of the membrane was conducted to obtain a polymer electrolyte membrane 1.

EXAMPLE 2

A polymer electrolyte membrane 2 was obtained in the same manner as in Example 1, except that PVDF film (thickness 50 µm) was used as a substrate, crosslinking treatment of the film was not conducted before polymerization, and after introduction of the treating mixed solution, the graft reaction was conducted by heating at 60° C. for 2 hours.

EXAMPLE 3

A polymer electrolyte membrane 3 was obtained in the same manner as in Example 2, except that 4-methylstyrene was used as a monomer in place of styrene.

EXAMPLE 4

A polymer electrolyte membrane 4 was obtained in the same manner as in Example 2, except that treatment energy in the sputtering treatment was 3 J/cm².

EXAMPLE 5

A polymer electrolyte membrane 5 was obtained in the same manner as in Example 2, except that after introduction of the treating mixed solution, the graft reaction was conducted by heating at 60° C. for 5 hours.

EXAMPLE 6

A polymer electrolyte membrane 6 was obtained in the same manner as in Example 1, except that after introduction of the treating mixed solution, the graft reaction was conducted by heating at 60° C. for 2 hours.

COMPARATIVE EXAMPLE 1

A polymer electrolyte membrane 11 was obtained in the same manner as in Example 2, except that sputtering treatment was not conducted.

COMPARATIVE EXAMPLE 2

A polymer electrolyte membrane 12 was obtained in the same manner as in Example 5, except that treatment energy in the sputtering treatment was 3 J/cm².

COMPARATIVE EXAMPLE 3

A polymer electrolyte membrane 13 was obtained in the same manner as in Example 1, except that after introduction of the treating mixed solution, the graft reaction was conducted by heating at 60° C. for 30 minutes

COMPARATIVE EXAMPLE 4

A polymer electrolyte membrane 14 was obtained in the same manner as in Example 2, except that graft reaction treatment was not conducted.

Evaluation Methods of Properties (1) Degree of grafting ($X_{ds}$)

The degree of grafting was calculated by the following equation.

$$X_{ds} = (W_2 - W_1) \times 100 / W_1$$

$W_1$ = Weight of polymer substrate before grafting (g)
$W_2$ = Weight of polymer substrate after grafting (g)

(2) Electroconductivity (κ)

Electroconductivity of a polymer electrolyte membrane was measured by an alternating current method (Shin Jikken Kagaku Koza 19, Polymer Chemistry II, p992, Maruzen).

Film resistance (Rm) was measured using ordinary film resistance measurement cell and LCR meter (E-4925A, Hewlett-Packard). A cell was filled with 1M sulfuric acid aqueous solution, and resistance between platinum electrodes (distance 5 mm) was measured by the presence or absence of a film. Electroconductivity (specific conductivity) was calculated using the following equation.

$$\kappa = 1/Rm \cdot d/S (\Omega^{-1}\,cm^{-1})$$

(3) Rate of Area Change (S)

A polymer electrolyte membrane was cut into 50 mm×50 mm, and allowed to stand in a dryer to sufficiently dry. Area of the membrane is designated S1. This sample was dipped in 40 wt % methanol aqueous solution at a liquid temperature of 25±2° C. for 24 hours. Area of this sample is designated S2. The rate of area change (S) was calculated by the following equation based on those values.

$$S = (S2-S1) \times 100/S1$$

(4) O/S Value, and Surface Element Proportion of S

Using ESCA (X-ray photoelectron spectroscopy) as an analytical instrument, a surface element proportion was measured under the following conditions, and O/S value was calculated based on the result.

Measurement device: Quantum 2000, ULVAC-PHI, INC.

Measurement area: 200 μm diameter

X-ray output: 30 W (15 kV)

X-ray source: Monochrome AlKα

Photoelectron takeoff angle: 45°

Neutralization condition: Co-use of neutralizer and ion gun (neutralization mode)

(O/S value)=(surface element proportion of O: atomic %)/(surface element proportion of S: atomic %)

(5) Adhesion

Adhesion test of a polymer electrolyte membrane to an electrode was conducted by the following method.

A membrane/electrode assembly was prepared using each of the polymer electrolyte membranes obtained in the Examples and the Comparative Examples.

Specifically, 5 g of platinum-supported carbon was dispersed in 100 ml of a Nafion solution dissolved in isopropanol (5 wt %). The resulting dispersion was applied to one surface of a polymer electrolyte membrane by screen printing, and dried at 100° C. for 20 minutes. The dispersion was also applied to other surface of the polymer electrolyte membrane and dried in the same manner as above. Thus, an electrode component was formed on both surfaces of the polymer electrolyte membrane. The membrane thus treated was further maintained under the conditions of 120° C. and 100 kg/cm², thereby preparing an electrolyte/electrode assembly.

The assembly was dipped in a 40 wt % methanol aqueous solution, and heated at 60° C. for 30 minutes in a sealed vessel, thereby the polymer electrolyte membrane was in a swelled state. The assembly was taken out of the solution, and heat dried by blowing air in an atmosphere of 60° C. to make it in a dry state. The atmosphere was returned to room temperature atmosphere. This operation was one cycle, and the test of 10 cycles in total was conducted. The number of cycles until the electrode and the polymer electrolyte membrane completely separate, and adhesion state at the completion of 10 cycles were confirmed.

Evaluation Result

The results obtained are shown in the Table below.

TABLE

| | Grafting Yield (%) | Surface Element Proportion (atomic %) | | | Rate of Area Change (%) | Electroconductivity ($\Omega^{-1}\,cm^{-1}$) | Adhesion* |
| --- | --- | --- | --- | --- | --- | --- | --- |
| | | O | S | O/S | | | |
| Example 1 | 16 | 12.2 | 1.0 | 12.2 | 25 | 0.11 | A |
| Example 2 | 22 | 22.1 | 1.7 | 13.0 | 30 | 0.12 | A |
| Example 3 | 20 | 21.3 | 1.9 | 11.2 | 32 | 0.12 | A |
| Example 4 | 22 | 19.3 | 3.7 | 5.2 | 32 | 0.11 | B |
| Example 5 | 38 | 30.2 | 4.8 | 6.3 | 43 | 0.18 | B |
| Example 6 | 11 | 11.7 | 0.4 | 29.3 | 14 | 0.03 | A |
| Comparative Example 1 | 22 | 18.8 | 4.0 | 4.7 | 32 | 0.12 | 2 |
| Comparative Example 2 | 38 | 28.0 | 5.2 | 5.4 | 44 | 0.18 | 7 |
| Comparative Example 3 | 6 | 10.3 | 0.2 | 51.5 | 5 | <0.001 | A |
| Comparative Example 4 | 0 | 9.4 | 0.1 | 94 | 0 | <0.001 | A |

*Adhesion
A: Substantially no peeling
B: Peeling at edges, but adhered state
Numerical value: Number of cycle until completely peeling As shown in the Table above, the assemblies obtained in Examples 1-6 substantially maintain an adhered state even after adhesion test of 10 cycles, whereas the assemblies obtained in Comparative Examples 1 and 2 are that the electrode and the polymer electrolyte membrane are completely be separated during the test. Further, although the assemblies obtained in Comparative Examples 3 and 4 have good adhesion, electroconductivity of the membranes is very low, and it was confirmed that such membranes do not function as a polymer electrolyte membrane.

It is believed that comparison between the results in the Examples and the results in the Comparative Examples clearly demonstrate the effectiveness of the polymer electrolyte membrane according to the present invention.

It should further be apparent to those skilled in the art that various changes in form and detail of the invention as shown and described above may be made. It is intended that such changes be included within the spirit and scope of the claims appended hereto.

This application is based on Japanese Patent Application No. 2004-260905 filed Sep. 8, 2004, the disclosure of which is incorporated herein by reference in its entirety.

What is claimed is:

1. A polymer electrolyte membrane for a polymer electrolyte fuel cell comprising a fluorine polymer substrate having grafted thereon vinyl monomers having sulfone groups as a cation-exchange group, wherein a main chain of the graft chain comprises a hydrocarbon or a partially fluorinated hydrocarbon, and sulfone groups or substituents having sulfone groups are bonded to the main chain through a C—C single bond as a side chain, and wherein the monomer is represented by formula (1)

(1)

wherein X represents H, hydrocarbon or F;

when X is H, $R_1$ represents —O—$C_nH_{2n+1}$, —C(=O)—$C_nH_{2n+1}$, —C(=O)—O—$C_nH_{2n+1}$, —C(=O)—OH

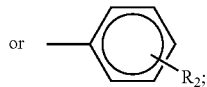

wherein $R_2$ represents —H, —$CH_3$, —$CH_2Cl$, —$CH_2OH$, —$C(CH_3)_3$, —$CH_2SO_3Na$, —Cl, —Br or —F;

when X is $CH_3$, $R_1$ represents —$C_6H_5$ or —C(=O)—OH; and when X is F, $R_1$ represents —C(=O)—OH or —C(=O)—$C_nH_{2n+1}$ wherein n is 1-10;

wherein in element compositional ratio by X-ray photoeletron spectroscopy ("ESCA"), at least one surface of the polymer eletrolyte membrane has O/S value of 5.0 or higher, and a surface element proportion of S is 0.4-5.0%.

2. The polymer electrolyte membrane as claimed in claim 1, wherein the polymer electrolyte membrane has a rate of area change after dipping in a 40 wt % methanol aqueous solution at a liquid temperature of 25±2° C. for 24 hours of 40% or lower.

* * * * *